United States Patent
Kondo et al.

(10) Patent No.: US 10,649,693 B2
(45) Date of Patent: May 12, 2020

(54) HARD DISK DEVICE AND METHOD OF CONTROLLING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yosuke Kondo, Fujisawa Kanagawa (JP); Kana Furuhashi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 147 days.

(21) Appl. No.: 15/910,396

(22) Filed: Mar. 2, 2018

(65) Prior Publication Data
US 2019/0073158 A1 Mar. 7, 2019

(30) Foreign Application Priority Data
Sep. 7, 2017 (JP) .................. 2017-172431

(51) Int. Cl.
*G06F 3/06* (2006.01)
*G06F 12/10* (2016.01)
(52) U.S. Cl.
CPC .......... *G06F 3/0659* (2013.01); *G06F 3/0604* (2013.01); *G06F 3/0644* (2013.01); *G06F 3/0674* (2013.01); *G06F 3/0676* (2013.01); *G06F 12/10* (2013.01); *G06F 2212/1016* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 5,166,936 A | * | 11/1992 | Ewert | G11B 20/1883 360/53 |
| 6,327,679 B1 | * | 12/2001 | Russell | G11B 19/04 369/53.1 |
| 7,394,606 B2 | | 7/2008 | Tashiro et al. | |
| 7,685,360 B1 | * | 3/2010 | Brunnett | G06F 3/0608 360/31 |

(Continued)

FOREIGN PATENT DOCUMENTS

JP 2008-152414 A 7/2008

*Primary Examiner* — William E. Baughman
(74) *Attorney, Agent, or Firm* — Kim & Stewart LLP

(57) ABSTRACT

A hard disk device accepts logical block addresses (LBAs) from a host. The hard disk device includes a disk having a plurality of physical sectors from which data is read and to which data is written, and a processor configured to perform read and write operations on the disk in response to read and write commands from the host that designate LBAs. The processor, in response to a request for initialization, does not perform any write operations on the disk, and generates a new mapping of LBAs to the physical sectors for a current generation based on unusable sectors detected during a previous generation, and tracks differences in correspondence between LBAs and the physical sectors between the current generation and the previous generation.

20 Claims, 7 Drawing Sheets

(56) References Cited

U.S. PATENT DOCUMENTS

| | | | | |
|---|---|---|---|---|
| 7,752,491 | B1* | 7/2010 | Liikanen | G06F 11/2087 |
| | | | | 714/6.13 |
| 8,019,925 | B1* | 9/2011 | Vogan | G06F 12/04 |
| | | | | 711/202 |
| 9,003,119 | B2 | 4/2015 | Sakai et al. | |
| 2002/0122266 | A1* | 9/2002 | Andoh | G11B 5/5526 |
| | | | | 360/69 |
| 2008/0189490 | A1* | 8/2008 | Cheon | G06F 12/0246 |
| | | | | 711/144 |
| 2009/0282301 | A1* | 11/2009 | Flynn | G06F 11/006 |
| | | | | 714/710 |
| 2011/0161621 | A1* | 6/2011 | Sinclair | G06F 12/0246 |
| | | | | 711/207 |
| 2011/0292533 | A1* | 12/2011 | Nitta | G11B 20/18 |
| | | | | 360/31 |
| 2013/0198586 | A1* | 8/2013 | Koike | G11B 20/1803 |
| | | | | 714/763 |
| 2017/0010823 | A1* | 1/2017 | Tomlin | G06F 12/0246 |

* cited by examiner

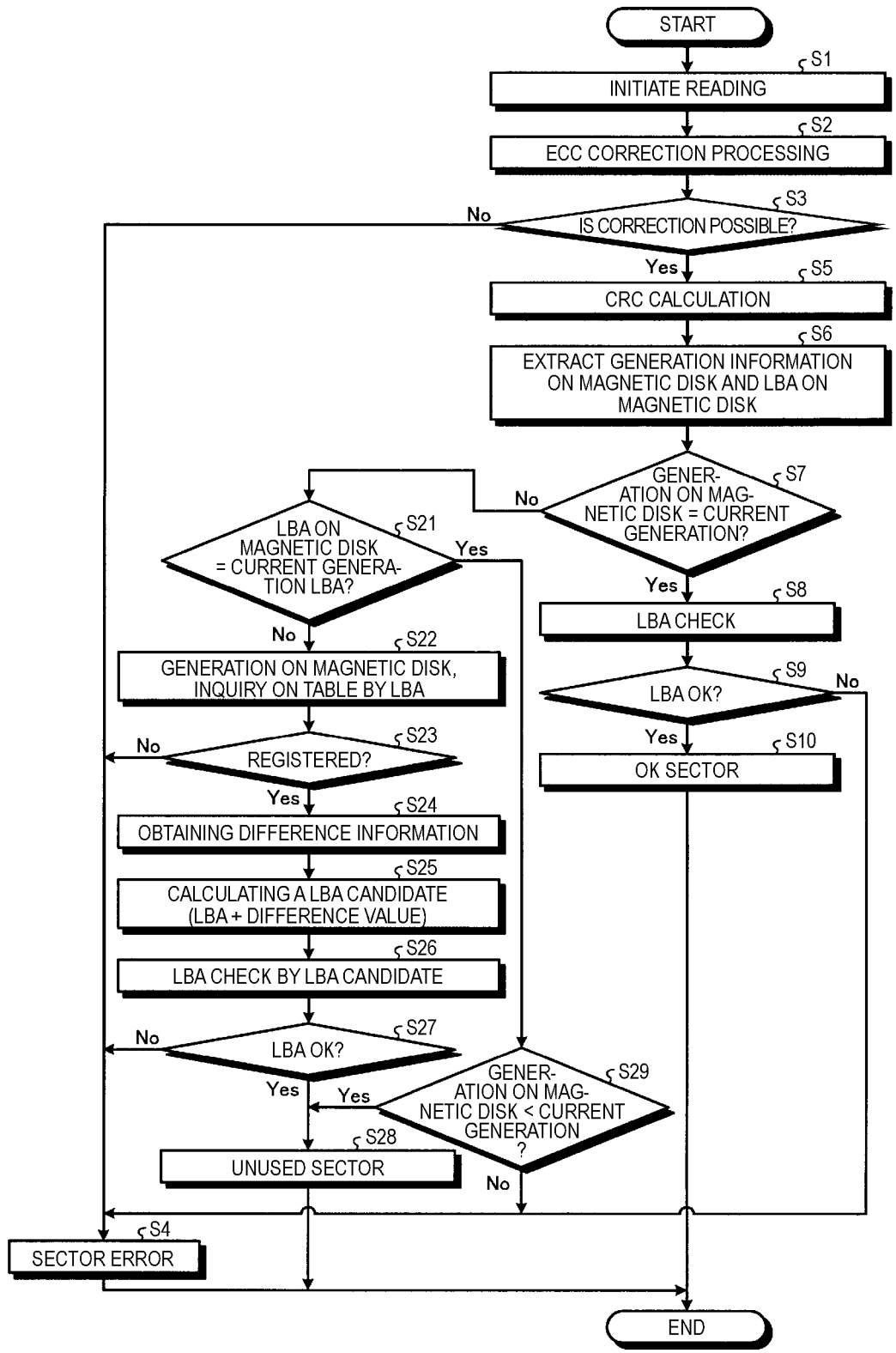

HARD DISK DEVICE AND METHOD OF CONTROLLING THE SAME

CROSS-REFERENCE TO RELATED APPLICATION

This application is based upon and claims the benefit of priority from Japanese Patent Application No. 2017-172431, filed Sep. 7, 2017, the entire contents of which are incorporated herein by reference.

FIELD

Embodiments described herein relate generally to a hard disk device and a method of controlling the same.

BACKGROUND

In a hard disk device of related art, a recording head is moved to a designated position on a recording disk in accordance with a command or an address designation from a host, and data is read from or written to a sector located at that position. One of the address designation methods by the host is a logical block address (LBA) method. In the LBA method, the hard disk device converts an LBA designated by the host into a physical address pointing to a sector on the recording disk, and positions the recording head in the sector corresponding to the LBA.

However, in the case of the LBA method, every time the hard disk device is initialized due to a failure, a user change, etc., the LBAs are reassigned again in the range of other sectors (referred to as "usable sectors") and reformatting of the recording disk is performed. However, it takes time to complete the initialization of all of the usable sectors by reformatting. Meanwhile, in each sector on the recording disk, cyclic redundancy check (CRC) data is written together with user data in order to prevent erroneous detection of error correction codes in low-density parity-check (LDPC) or the like. The reformatting includes a process of rewriting CRC data based on an old LBA in a usable sector on the recording disk to CRC data based on a new LBA. Thus, when the reformatting is not performed, the CRC data based on the old LBA is still present in the sector when the sector designated by the new LBA is read, resulting in a CRC error, and thus the usable sector cannot be normally used.

DESCRIPTION OF THE DRAWINGS

FIG. 9 is a flowchart showing an example process when reading and writing data by a Micro Processing Unit (MPU) according to one embodiment.

DETAILED DESCRIPTION

Figure 1:
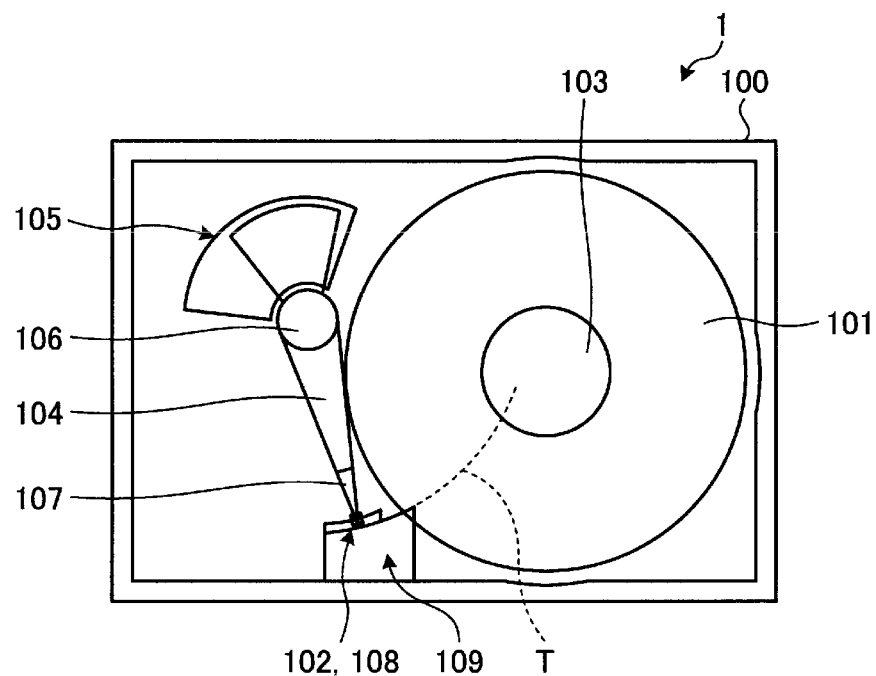
FIG. 1 shows an example of a configuration of a hard disk device according to one embodiment.

Embodiments provide a hard disk device and a method of controlling the same, in which a usable sector is enabled to be used normally without reformatting a recording disk when a logical block address (LBA) is reassigned.

According to one embodiment, there is provided a hard disk device that accepts logical block addresses (LBAs) from a host. The hard disk device includes a disk having a plurality of physical sectors from which data is read and to which data is written, and a processor configured to perform read and write operations on the disk in response to read and write commands from the host that designate LBAs. The processor, in response to a request for initialization, does not perform any write operations on the disk, and generates a new mapping of LBAs to the physical sectors for a current generation based on unusable sectors detected during a previous generation, and tracks differences in correspondence between LBAs and the physical sectors between the current generation and the previous generation.

Hereinafter, a hard disk device according to an embodiment and a method of controlling the same will be described in detail with reference to the accompanying drawings. However, the present disclosure is not limited to the embodiment described.

Embodiment

According to an embodiment, a hard disk device accepts an address designation by logical block addressing (LBA) from a host. In such a hard disk device, when reassignment of LBAs takes place during initialization of the hard disk device, reformatting of recording disks of the hard disk device may be omitted, thereby reducing the time required for completion of the initialization process. According to the embodiment, the hard disk device includes a unit for replacing the reformatting process, and operates as follows. For example, when LBAs are assigned, difference values between new generation LBAs of the hard disk device and old generation LBAs are managed. Old generation LBAs are LBAs from a previous "generation" of the hard disk device, i.e. from a previous time that LBAs were assigned in the hard disk device as part of an initialization process. In addition, for each sector on the recording disk, at a time after initialization that the hard disk device is accessed, generation information is written, as well as LBAs assigned to that sector in the current generation. In addition, for example, when data are written on the recording disk, it is determined whether or not a sector in an access destination has been used before in the new (current) generation based on the generation information that was previously written in that sector. When the generation information previously written in that sector does not indicate the current generation, the existing (previously written) generation LBA for the sector is corrected to a new LBA that would be written in the sector by, for example, adding a difference value that is associated with the sector. When the checking at the corrected LBA is correct after the correction, the sector is determined as an unused sector.

The "Generation" of the hard disk device is incremented upwards by one every time LBAs are reassigned. For example, the generation of the hard disk device at the time of incorporating a new recording disk is set to "Generation 0". The generation of the hard disk device after reassignment of LBAs with respect to the recording disk is performed is set to "Generation 1". Subsequently, each time LBA reassignment is performed, the generation of the hard disk device is incremented upward by one. In addition, the higher the number is, the "newer" (or "higher") the generation is.

Hereinafter, descriptions will be made of one example application of the invention with respect to a hard disk device having a magnetic head and a magnetic disk. A "magnetic disk" corresponds to a "recording disk", and a "magnetic head" corresponds to a "recording head".

FIG. 1 shows an example of a configuration of a hard disk device according to one embodiment. FIG. 1 shows a configuration inside a case 100 when the upper cover of the hard disk device 1 is removed. As shown in FIG. 1, the hard disk device 1 includes a magnetic disk 101 and a magnetic head 102 for reading and writing data, etc.

The magnetic disk 101 is one (the first magnetic disk 101) of two magnetic disks and the other (the second magnetic disk 101 (see FIG. 3)) is disposed beneath (not visible in FIG. 1) the first magnetic disk 101. According to this embodiment, the number of magnetic disks is described as two, but the number of magnetic disks may be one, or may be three or more. The first magnetic disk 101 and the second magnetic disk 101 are mounted at a predetermined pitch in the axial direction on a rotating shaft 103, and rotate in tandem with the same number of rotations by the rotational device of the rotating shaft 103.

A magnetic head 102 is attached to the distal end of an arm 104. The arm 104 is driven by a voice coil motor (VCM) 105 and rotates within a range determined in both directions (positive and negative) about an axis 106. With this operation, the magnetic head 102 moves along a dashed line T and is position on a radial track of the magnetic disk 101. A total of four sets of head units, each including the magnetic head 102 and the arm 104, are provided, one set being provided on each of the front side and the back side of each magnetic disk 101.

Specifically, the magnetic head 102 is mounted on a head slider 108 placed at the tip of a suspension 107 disposed at the front end of the arm 104. The magnetic head 102 has a read element and a write element, in which the read element reads data on the surface on the magnetic disk 101, and the write element writes data on the surface on the magnetic disk 101. In the example shown in FIG. 1, the magnetic head 102 reads data from and writes data to the surface on the first magnetic disk 101.

The hard disk device 1 includes a ramp load mechanism 109 that retracts and parks the magnetic head 102 away from the magnetic disk 101.

A control circuit 20 (see FIG. 3) that controls each module of the hard disk device 1 is disposed in a bottom portion of the hard disk device 1 (not visible in FIG. 1). The control circuit 20 communicates with a host (not shown) via an interface such as a connection pin configured for external connection to a case 100 of the hard disk device 1, and controls each module of the hard disk device 1 in response to a command or the like from the host.

Figure 2:
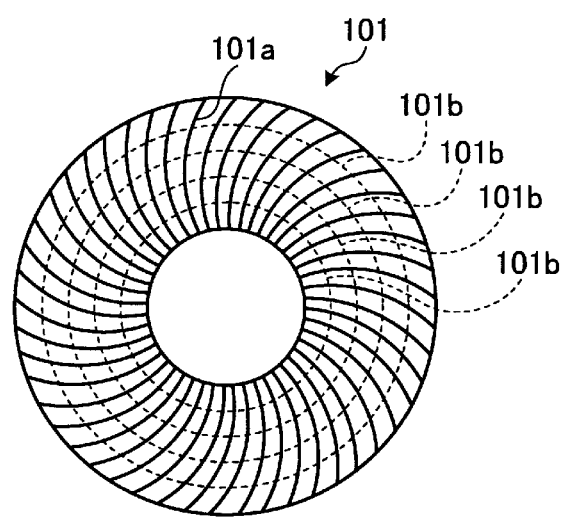
FIG. 2 is an explanatory view illustrating a configuration of a magnetic disk according to one embodiment.

FIG. 2 is an explanatory view illustrating the configuration of the magnetic disk 101. The magnetic disk 101 has a magnetic substance on both sides of the platter, and servo information is written on one or more of the platters by a servo writer or the like before shipment. FIG. 2 shows servo zones 101a arranged radially as an example of the arrangement of servo zones in which the servo information is written. In the radial direction of the magnetic disk 101, a plurality of concentric circular tracks 101b are positioned at a predetermined pitch. A plurality of sectors is continuously formed along each track 101b. Each sector has a magnetic region and data can be written thereto freely. The data length of each sector is, for example, 512 bytes. However, the data length is not limited thereto, and may have other data lengths such as 4 kilobytes. In a data zone in which sectors are arranged, a system area is disposed on, for example, one or more outermost tracks, while the rest of the data zone is set as a user area.

Figure 3:
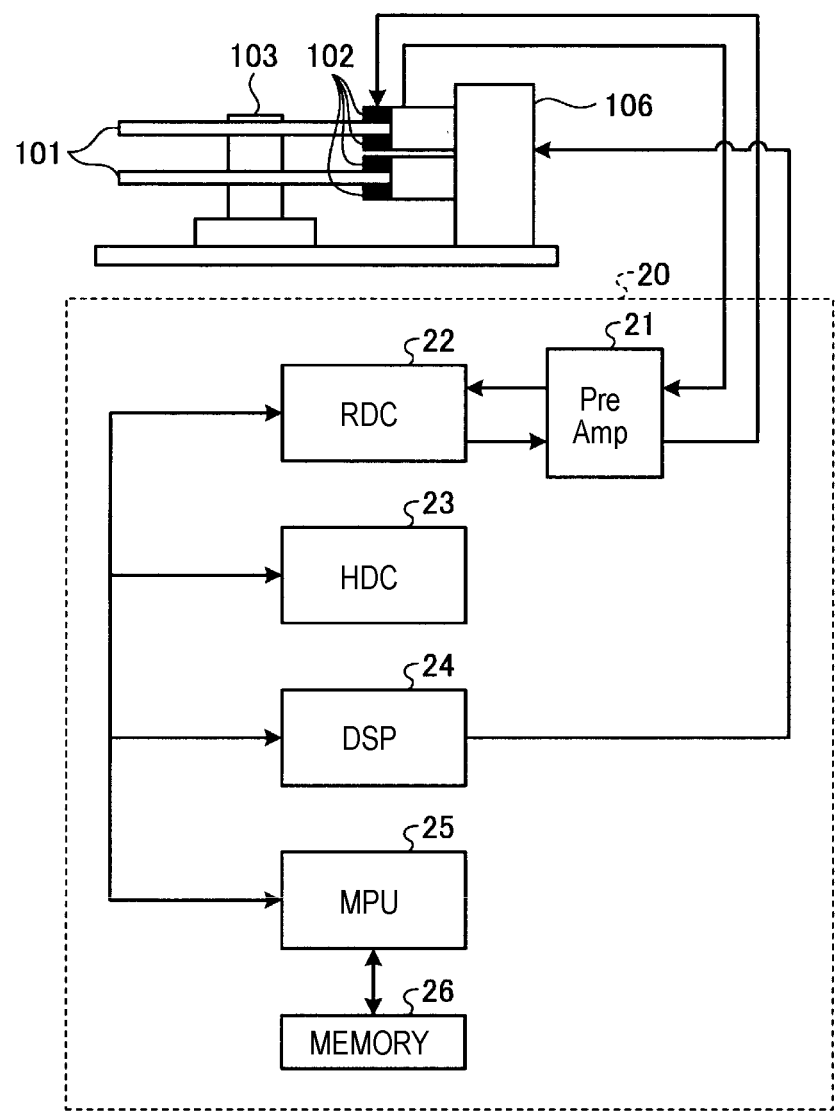
FIG. 3 is a view showing an example of a configuration of a control circuit of a hard disk device according to one embodiment.

FIG. 3 is a view showing an example of the configuration of a control circuit of a hard disk device. In FIG. 3, elements that are the same as those shown in FIG. 1 will be denoted by the same reference numerals. The control circuit 20 includes a preamplifier 21, a Read Channel Circuit (RDC) 22, a Hard Disk Controller (HDC) 23, a Digital Signal Processor (DSP) 24, a Micro Processing Unit (MPU) 25, and a memory 26.

The preamplifier 21 sends a write signal to the magnetic head 102 (write element) and amplifies a read signal of the magnetic head 102 (read element).

The RDC 22 performs a signal-shaping on the read signal from the preamplifier 21, and performs generation of a synchronous clock, generation of a gate signal, and output of a read signal.

The DSP 24 controls the spindle motor or the VCM 105 to perform a positioning control such as seeking or following. Specifically, the DSP 24 demodulates servo information obtained from the read signal from the RDC 22, and calculates a VCM drive command value according to an error between the position demodulated from the servo information and a target position, thereby performing positioning control of the magnetic head 102.

The HDC 23 communicates with the host via an interface such as AT Attached (ATA). Further, in accordance with the gate signal and the clock from the RDC 22, the HDC 23 receives the read data from the RDC 22, stores the read data in the buffer, and transmits the read data to the host. Further, the HDC 23 outputs the write data from the host to the RDC 22 in accordance with the gate signal and clock of the RDC 22.

The MPU 25 interprets the command from the host received by the HDC 23, and performs the monitoring of the status of the various components of the hard disk device 1 and the control of each module of the hard disk device 1. For example, the MPU 25 performs an initialization process according to an embodiment of the present disclosure and a reformatting omission process such as rewriting data to be returned to the host, etc. The memory 26 is a nonvolatile memory to which data can be rewritten freely. The memory 26 stores programs (such as an initialization program, a reformatting omission program, etc.) and data (new generation information or values, an LBA/physical address conversion table, a generation correspondence table, etc.) for various processes and controls executed by the MPU 25.

In the above configuration, the address designation method of the hard disk device 1 by the host is an LBA method, and the MPU 25 controls each module according to a command received from the host by the HDC 23.

Next, the initialization process will be described. There may be instances in which some sectors become unusable, such as when the magnetic head cannot be positioned due to a mechanical failure, etc. on some tracks on the magnetic disk, or when one magnetic head fails and all the sectors on one side of the corresponding magnetic disk become unusable. In addition, there may be instances in which some areas cannot be accessible due to a defect of the magnetic disk. In this case, the hard disk device 1 needs to be initialized. Furthermore, when the user of the hard disk device 1 is changed, the hard disk device 1 is sometimes initialized. According to this embodiment of the initialization process, the typical reformatting that is performed on a magnetic disk when reassignment of LBAs is performed is instead omitted, thereby reducing the time required for completion of the initialization process. According to this embodiment, instead of a conventional reformatting process being performed on the magnetic disk, user data and Modified CRC (Cyclic Redundancy Check) data (described later) are written without reformatting on a target sector when writing data to the target sector on the magnetic disk.

Figure 4:
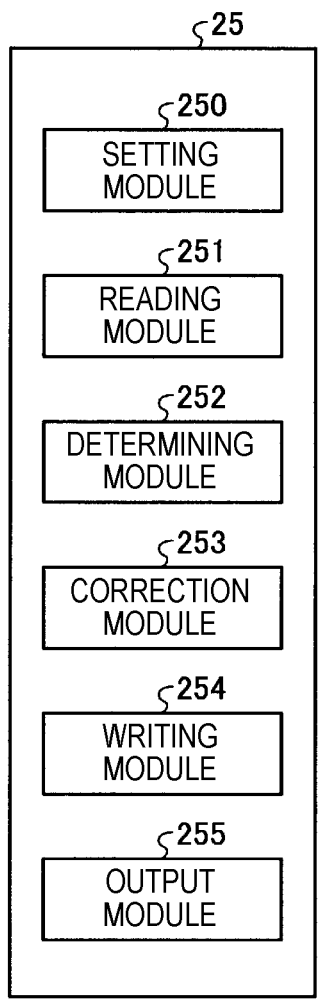
FIG. 4 is a view showing an example of a functional block according to one embodiment.

FIG. 4 is a view showing an example of a functional block with which the MPU 25 properly executes and implements the programs of the memory 26. As shown in FIG. 4, MPU 25 includes a setting module 250, a reading module 251, a determining module 252, a correction module 253, a writing module 254, and an output module 255. Together, these modules perform the functions that enable the omission of reformatting.

When the LBAs are assigned as part of an initialization process, the setting module 250 updates a "generation correspondence table" for managing the LBAs and generation information for the LBAs that indicates in which generation the LBAs were reassigned. Specifically, the setting module 250 sets difference values between old generation LBAs and new generation LBAs. The old generation LBAs are LBAs that were reassigned to different sectors in a previous generation than the current generation of the hard disk device 1 the difference values. The new generation LBAs are shifted by the difference values during the reassignment process in a new generation.

The reading module 251 reads data written in a sector corresponding to an LBA designated by the host. Specifically, based on the LBA transmitted from the host together with a command, the reading module 251 obtains the physical address of the sector corresponding to the LBA from the LBA/physical address conversion table, controls the preamplifier 21, the RDC 22, the HDC 23, the DSP 24, etc. based on the physical address, and reads data from the target sector.

The determining module 252 performs various determinations based on the data read by the reading module 251. For example, the determining module 252 extracts generation information, such as a generation value, from the data read by the reading module 251. The determining module 252 then determines whether the extracted generation information includes a value indicating the current generation associated with the physical address is the same as the current generation of the hard disk device 1. For example, the determining module 252 may compare the value in the extracted generation information that is associated with the physical address to corresponding generation information that is associated with the physical address and is stored in the memory 26. In this way, the determining module 252 can determine whether a particular sector is 1) a sector that was overwritten in the current generation of the hard disk device 1, or 2) an unused sector that has not been overwritten in the current generation, i.e., a sector that has not been overwritten since any writing or overwriting was performed in any previous generation. Other determinations performed by determining module 252 will be described subsequently in conjunction with a processing flow description.

When the determining module 252 determines that a particular sector is not a sector of the current generation of the hard disk device 1 (e.g., the sector has not been overwritten in the current generation, the correction module 253 corrects the current generation LBAs associated with the particular sector to the old generation LBAs, based on the generation correspondence table.

The writing module 254 causes the user data to include the generation information of the current generation and the current generation LBAs in new user data, and overwrites previous user data stored in a recording sector in a particular writing destination designated by the host with the new user data.

The output module 255 returns certain predetermined data from the HDC 23 to the host based on the determination result of the determining module 252. For example, when it is determined that the predetermined data are data that have been written in the current generation, and are read as a result of reading an LBA designated by the host, the data read from the LBA designated by the host is returned to the host without modification. Further, when it is determined that the predetermined data are data that were written in an old generation, a data value indicating an unused sector (e.g., all 0, etc.) is returned.

Here, the setting module 250 corresponds to a setting unit. The reading module 251 corresponds to a read unit. The determining module 252 corresponds to a "first determining unit" and a "second determining unit". The correction module 253 corresponds to a "correction unit". The writing module 254 corresponds to a "writing unit". The output module 255 corresponds to an "output unit".

Hereinafter, to describe in detail the omission of reformatting according to various embodiments, the configuration of Modified CRC data to be written on a magnetic disk, the configuration of a generation correspondence table, and a data update procedure of each sector on the magnetic disk will be described.

Modified CRC Data

Figure 5A:
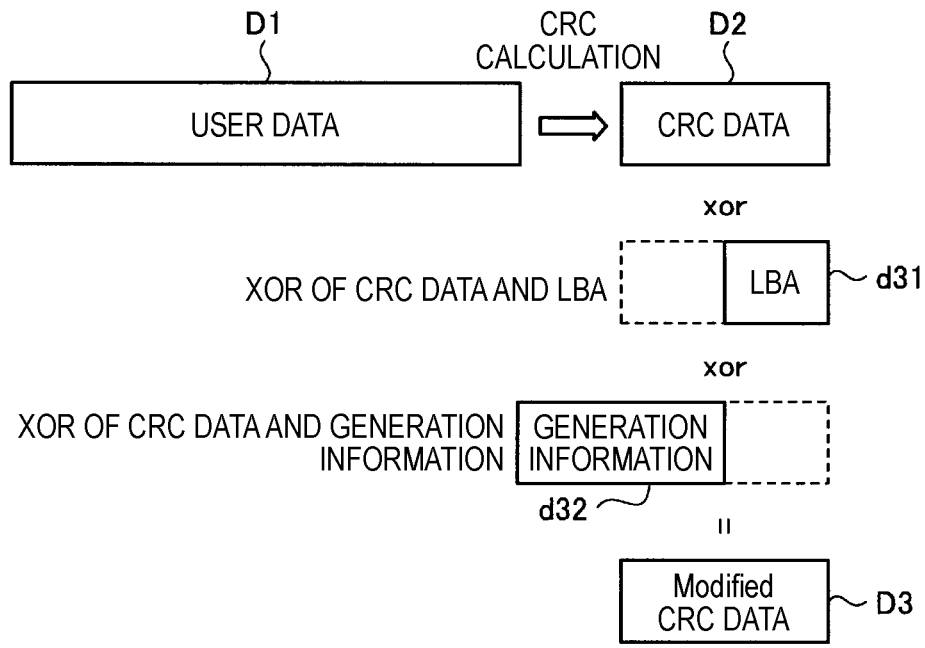
FIGS. 5A and 5B are views showing an example of a process of generating Modified CRC data and an example of a data structure of a sector according to one embodiment.
Figure 5B:
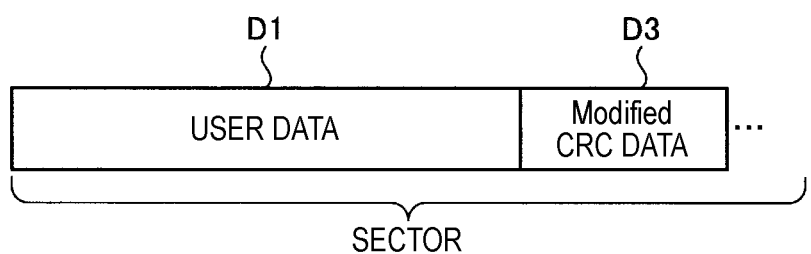

FIGS. 5A and 5B are views showing an example of a procedure of generating Modified CRC data and an example of a data structure of a sector. As shown in FIG. 5A, the MPU 25 calculates the CRC data from the user data D1 received from the host and generates CRC data D2. Further, the MPU 25 performs an exclusive OR (XOR) operation on a predetermined number of bit strings of the generated CRC data D2 with LBA d31, performs an XOR operation on the remaining bit strings of the CRC data D2 with generation information d32, and generates CRC data D3 in which the LBA d31 and the generation information d32 are embedded (this will be referred to as "Modified CRC data").

Here, the LBA d31 and the generation information d32 are the most recent LBA and the most recent generation information stored in the memory 26 of the hard disk device 1 at the time of the above-described embedding. The "generation information" is the information obtained by updating the generation value by one every time the "LBA" d31 is reassigned. For example, the generation of the hard disk device 1 at the time of incorporating a new magnetic disk 101 therein is set as "Generation 0". Then, the generation of the hard disk device 1 after the reassignment of LBAs is performed on the magnetic disk 101 due to defects of the magnetic head 102 or the magnetic disk 101, etc. is set to be "Generation 1". Subsequently, every time the reassignment of LBAs is performed, one is added to the number of the generation of the hard disk device 1. The higher the number is, the "newer" (or "higher") the generation value is.

The order of embedding the LBA d31 and the generation information d32 with respect to the CRC data D2, or the position that the LBA d31 and the generation information d32 are embedded with respect to the CRC data D2 may be appropriately modified without being limited to this example. For example, the embedding order may be changed, the embedding may be performed at the same time, or the embedding position may be changed.

As indicated by an ellipsis in FIG. 5B, additional information besides user data D1 and Modified CRC data D3 may be written in each sector on the magnetic disk 101. For instance, the additional information may include ECC (Error Checking and Correction) data in addition to the Modified CRC data D3. First, the CRC data D2 is obtained by, for example, calculating the CRC from all data D1. Then, the Modified CRC data D3, which is obtained by embedding the originally assigned LBA d31 of Generation 0 and the generation information d32 indicating Generation 0 in the CRC data D2, is written in each sector.

Generation Correspondence Table

The MPU 25 generates a generation correspondence table and manages the change history of the reassignment of LBAs in each generation of the hard disk device 1 based on the generated generation correspondence table. An example of the data structure of the generation correspondence table, and a method for consistently managing, by the MPU 25, LBAs for each generation will now be described in conjunction with FIG. 6.

Figure 6:
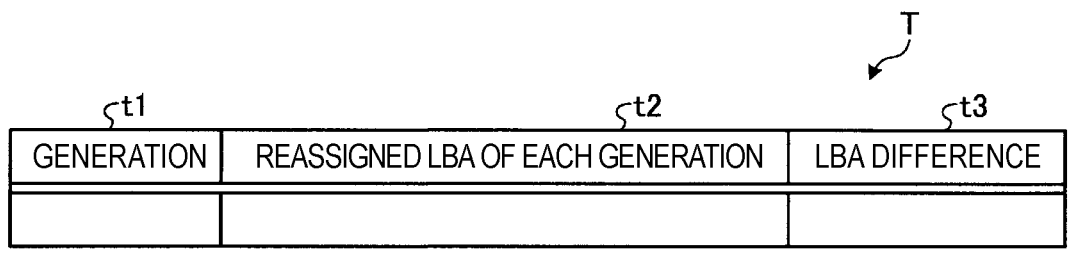
FIG. 6 is a view showing an example of a data structure of a generation correspondence table according to one embodiment.

FIG. 6 is a view showing an example of a data structure of a generation correspondence table T. FIG. 6 shows the generation correspondence table T having a data structure in which the entries "generation" t1, "reassigned LBA of each generation" t2, and "LBA difference" t3 are associated with each other.

In "generation" t1, the generation information corresponding to the generation in which LBAs were reassigned by the hard disk device 1 is set as the generation information value of the hard disk device 1.

Difference information generation correspondence table T includes values for the "reassigned LBAs of each generation" t2 and the "LBA difference" t3. Specifically, the reassigned LBAs of each generation are set as values in the "reassigned LBAs of each generation" t2. For example, when LBAs associated with a particular sector in the current generation are different from the LBAs associated with that particular sector in the preceding generation, the LBAs associated with the particular sector in the current generation are set as values in the "reassigned LBAs of each generation" t2. The difference value between 1) LBAs set as values in the "reassigned LBAs of each generation" t2 (i.e., reassigned LBAs) and 2) the LBAs associated with the same sector in the preceding generation as the reassigned LBAs is set as a value in the "LBA difference" t3.

Figure 7:
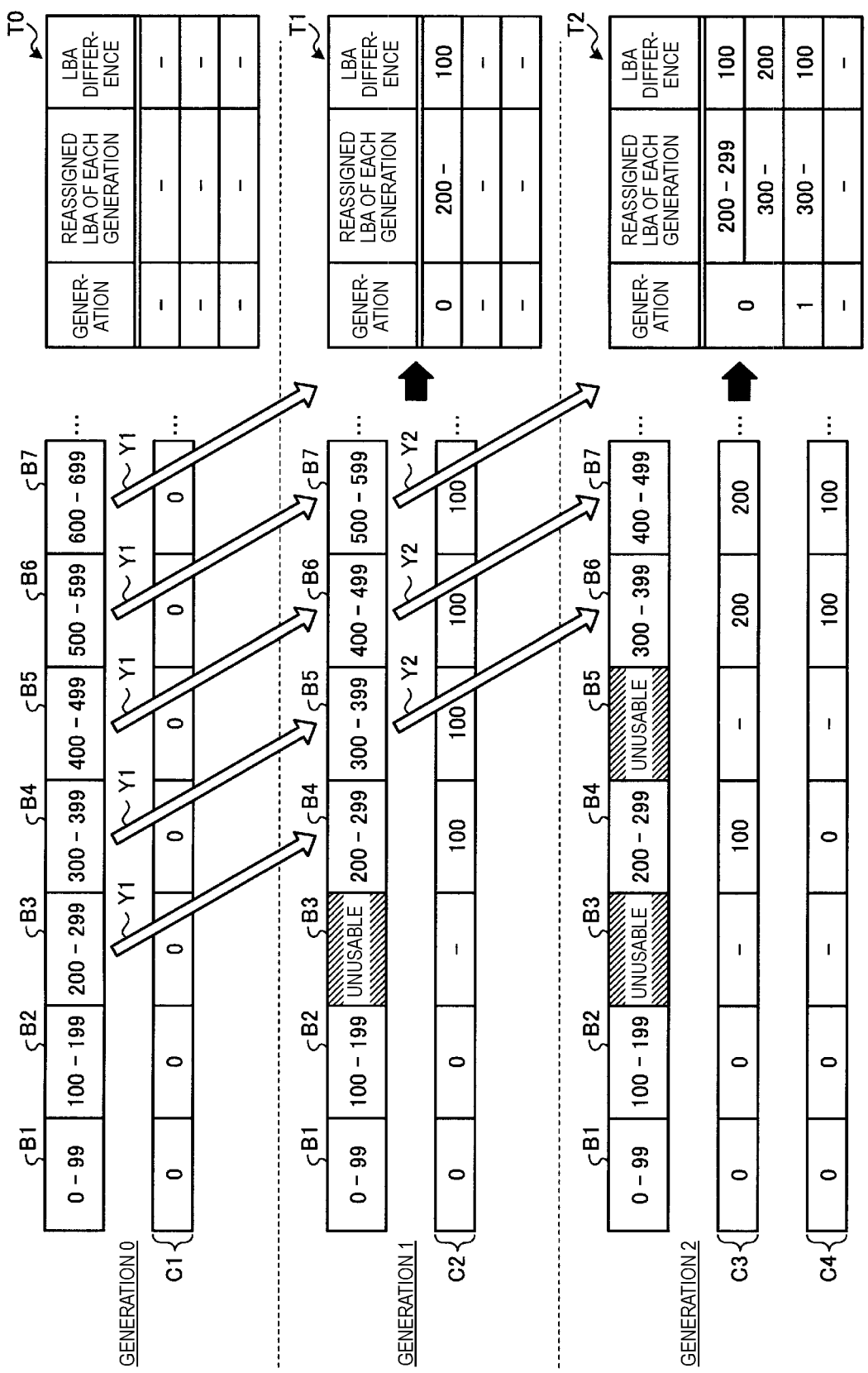
FIG. 7 is an illustration for describing a method for consistently managing LBAs, according to one embodiment.

FIG. 7 is an illustration for describing a method for consistently managing LBAs, according to various embodiments. FIG. 7 schematically shows states in which LBAs are reassigned every time the generation of the hard disk device 1 changes, as well as an example of setting values in generation correspondence tables T in subsequent generations. By way of example, the states and generation correspondence tables T from Generation 0 to Generation 2 are depicted.

In FIG. 7, the physical blocks B1, B2, and so on indicate the sectors on the magnetic disk 101 from the foremost sector to the last sector in this order. For example, the foremost sector is the first sector on the front side of the first magnetic disk 101, which is followed by all the sectors on the front side of the first magnetic disk 101, then by all the sectors on the back side of the first magnetic disk 101, then by all the sectors on the front side of the second magnetic disk 101, then by all the sectors on the back side of the second magnetic disk 101, and is terminated at the last sector on the back side of the second magnetic disk 101.

The numbers shown within the physical blocks B1, B2, . . . indicate LBAs assigned to the respective sectors of each physical block. For example, "0-99" indicated in the physical block B1 of Generation 0 indicates that LBAs 0-99 are assigned to 100 sectors sequentially arranged in the physical block B1 in ascending order. The "unusable" shown in the physical block B3 or the physical block B5 indicates the regions of unusable sectors to which access cannot be made in each immediately preceding generation. For example, the "unusable" physical blocks B3 shown in Generation 1 and Generation 2 are the regions that become unusable sectors in Generation 0. The "unusable" physical block B5 shown in Generation 2 is the region that becomes an unusable sector in Generation 1.

Arrows Y1 and Y2 shown in FIG. 7 indicate the shift in physical positions of the reassigned LBAs from a preceding generation to the next generation as a result of reassignment of the LBAs. This example indicates that the physical block B3 in Generation 0 becomes "unusable", and that the LBAs that were assigned to the physical block B3 in Generation 0 are shifted by 100 in Generation 1 to physical block B4. Further, the physical block B5 in Generation 1 is indicated to have become "unusable", and the LBAs that were assigned to the physical block B5 in Generation 1 are shifted by 100 in Generation 2 to physical block B6.

Differences C1, C2, . . . shown directly below the physical blocks B1, B2, . . . of the various generations indicate respective difference values (measured in LBAs) of each physical block B1, B2, . . . , in the current generation and the physical block B1, B2, . . . , in the preceding generations.

Specifically, in Generation 0, since there is no preceding generation, the difference value for each of the physical blocks B1, B2, . . . is zero. In Generation 1, since the preceding generation is Generation 0, the difference value for each of the physical blocks B1, B2, . . . is the difference value for the physical block in Generation 0 plus the difference value for the physical block in Generation 1. Therefore, since the LBAs following the physical block B3 in Generation 1 are shifted by 100, the difference value of each of the LBAs following the physical block B3 becomes "100". In Generation 2, since the preceding generations are Generation 0 and Generation 1, there are two difference values for each of the physical blocks B1, B2, . . . . Specifically, for each of the physical blocks B1, B2 . . . , there is a difference value for the values of LBAs between Generation 2 and Generation 0 and a difference value for the values of LBAs between Generation 2 and Generation 1. The difference value for the LBAs assigned to a physical block for between Generation 2 and Generation 0 is the sum of the difference value between Generation 0 and Generation 1 for the physical block and the difference value between Generation 1 and Generation 2 for the physical block. Thus, the LBAs following the physical block B5 in Generation 2 are shifted by 100 from the LBAs following the physical block B5 in Generation 1. In addition, the LBAs following the physical block B5 in Generation 2 are shifted by 200 from the LBAs following the physical block B5 in Generation 0.

As a result, the difference values of LBAs for a particular physical block between Generation 1 and Generation 2 following the physical block B5 become "100." The difference values between Generation 0 and Generation 2 for a particular physical block are obtained as a result of adding the difference values between Generation 0 and Generation 1 for the particular physical block and the difference values between Generation 1 and Generation 2 for the particular physical block. That is, the difference value of the physical block B4 for Generation 2 becomes 100 (100 (the difference value between Generation and Generation 1 for physical block B4)+0 (the difference value between Generation 1 and Generation 2 for physical block B4)=100). The difference value of either the physical block B6 or the physical block B7 for Generation 2 become 200 (100 (the difference value between Generation 0 and Generation 1 for physical block B6 or B7)+100 (the difference value between Generation 1 and Generation 2 for physical block B6 or B7)=200).

When a part of sectors in Generation 0 becomes unusable as described above, the reassignment of LBAs is performed, and the number of the generation is increased by one in response to this reassignment. When the reassignment of LBAs is performed in Generation 0, Generation 0 of the hard disk device 1 becomes Generation 1; and when the reassignment of LBAs is performed in Generation 1, Generation 1 of the hard disk device 1 becomes Generation 2. In other words, when the reassignment of LBAs is performed in Generation n, the generation of the hard disk device 1 becomes Generation n+1 (where n is an integer equal to or greater than 0).

An example of recording (setting) the generation correspondence table T for each generation in FIG. 7 will now be described. In the generation correspondence table T0 at Generation 0, there is no recording of values because the LBAs are not reassigned.

In the generation correspondence table T1 at Generation 1, information is recorded indicating the difference with the immediately preceding generation in which an unusable sector occurs (i.e., Generation 0). More specifically, the information that is recorded includes the generation information "0", the LBA numbers for which a value other than 0 is set as the difference C2, and the value of the difference C2 corresponding to the physical blocks for which the difference C2 is the value other than 0. In this example, the difference value corresponding to the physical block B4 is 100, which is the value other than 0. Therefore, the information that is recorded includes the generation information "0", the LBA numbers 200-299 (which were assigned to the physical block B4 in generation 0), and the value 100 of the difference C2. All the LBAs following the LBA number 200 have the difference value of 100. The LBA numbers "200-" shown in the generation correspondence table T1 indicate all the LBAs following the number 200 for easy understanding.

In the generation correspondence table T2 at Generation 2, the information recorded for Generation 0 is updated, and information is additionally recorded indicating the difference with the preceding generation in which unusable sectors occur (i.e., Generation 1). The specific registration method is the same as described above in Generation 1. The record information of Generation 0 is updated based on the difference C3, and the record information of Generation 1 is updated based on the difference C4.

Thus, every time the reassignment of LBAs is performed, the generation correspondence table T is updated as described above. Further, since unusable sectors are newly added during each generation and the difference information for each generation is also changed, the previously set values for each generation in which such changes have been made are also updated when generation correspondence table T is updated.

The data structure of the generation correspondence table T described herein is also an example, and the configuration thereof may be modified such that only a difference is stored in each generation.

Data Update Procedure of Each Sector on the Magnetic Disk 101

In this embodiment, when a command to write user data in a sector designated by an LBA is received from a host, the MPU 25 determines whether or not the sector is a sector that may be written to as an unused sector by the generation correspondence table T (see FIG. 6), and when it is determined that the sector may be written to as an unused sector, the user data is written in the sector and the Modified CRC data is updated.

The processes for omitting the reformatting will now be described in more detail. In this embodiment, the MPU 25 determines whether or not the sector designated by an LBA is an unused sector described above. Then, when it is an unused sector, the MPU 25 performs the processes for omitting the reformatting. For example, when a write command including user data is received from the host, the MPU 25 writes the user data in the designated sector and causes the already written old Modified CRC data to be updated by the new Modified CRC data of the hard disk device 1. The new Modified CRC data is created by embedding the generation information of the current generation stored in the memory 26 by the hard disk device 1 and the currently reassigned LBAs into the CRC data that is CRC-calculated by the MPU 25 from the user data.

Figure 8:
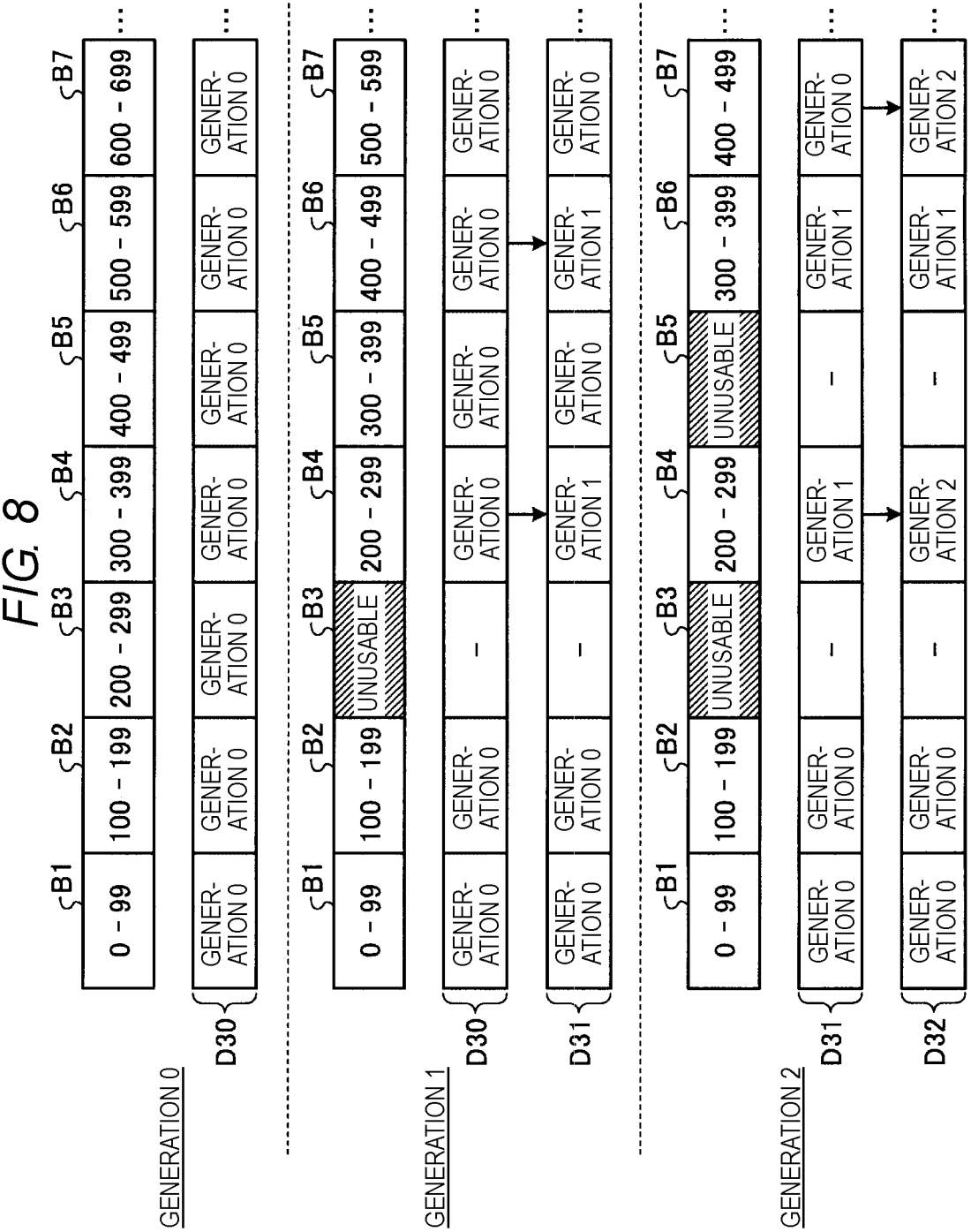
FIG. 8 is a conceptual diagram illustrating the timing of using an unused sector on the magnetic disk during different generations, according to one embodiment.

FIG. 8 is a conceptual diagram for describing an example of a procedure for accessing an unused sector in each of the various generations present on the magnetic disk 101. FIG. 8 shows the generations indicated by the Modified CRC data D3 before rewriting of the physical blocks B1, B2, . . . . FIG. 8 also shows the generations indicated by the Modified CRC data D3 after the rewriting, from generation to generation. "Unusable" physical blocks occurring in each generation in the physical blocks B1, B2, . . . and the reassignment method of LBAs are the same as described above in conjunction with FIG. 7.

In Generation 0, as shown in the pattern D30 of the Modified CRC data in FIG. 8, all the respective Modified CRC data D3 of physical blocks B1, B2, . . . are Modified CRC data D3 for Generation 0.

In Generation 1, the Modified CRC data D3 of respective physical blocks B1, B2, . . . immediately after the assignment of LBAs is set to the pattern D30 of the Modified CRC data shown in "Generation 0." It is noted that the LBAs do not match the pattern of "Generation 1". Then, the sectors designated for writing within the current generation of the hard disk device 1 (i.e., generation 1) are rewritten to include the Modified CRC data of "Generation 1". As shown in the pattern D31 of the Modified CRC data, this example illustrates that the sectors "200-299" and the sectors "400-499" are "Generation 1," and the Modified CRC data of these sectors is rewritten.

In Generation 2, the Modified CRC data D3 of respective physical blocks B1, B2, . . . immediately after the assignment of LBAs is set to the pattern D31 of the Modified CRC data shown in "Generation 1", and the LBAs do not match the pattern of "Generation 2". Consequently, the sectors designated for writing within the current generation of the hard disk device 1 are rewritten in to include the Modified CRC data of "Generation 2". As shown in the pattern D32 of the Modified CRC data, this example illustrates that the sectors "200-299" are rewritten, so that the Modified CRC data from the preceding "Generation 1" is altered to the Modified CRC data for "Generation 2". Further, it shows that the sectors "400-499" are rewritten so that the original Modified CRC data from "Generation 0" is updated to the Modified CRC data of "Generation 2".

In this way, when an unused sector is designated by the host as a user data write destination, the Modified CRC data of the old generation (which is still written in the unused sector on the magnetic disk 101) is rewritten as the Modified CRC data for the new generation. Generally, the Modified CRC data of each old generation is dispersed over all the sectors on the magnetic disk 101. However, when the host designates a sector as a write destination, the Modified CRC data of the old generation for the designated sector is rewritten to be the Modified CRC data for the new generation, and the sector can be accessed in the new generation. According to conventional approaches, every time the generation of the hard disk device is changed, all the sectors on the magnetic disk 101 should be reformatted. However, according to embodiments disclosed herein, even if the reformatting is omitted, it is possible to use the sectors in each generation.

Processes for Omitting the Reformatting

Next, the processes for omitting the reformatting performed by the hard disk device 1 for each generation will be described. In the hard disk device 1, the setting module 250 updates the generation correspondence table T in accordance with the reassignments of LBAs. Then, in each generation, the MPU 25 performs the following processes based on the updated generation correspondence table T, thereby omitting the reformatting.

FIG. 9 is a flowchart showing an example process when reading and writing data by the MPU 25. First, the MPU 25 reads data from a sector on the magnetic disk 101, which corresponds to an LBA designated by the host (S1) according to a current LBA to sector mapping maintained by the MPU 25.

Subsequently, the MPU 25 executes an error correction process from the ECC which is added to the read data (S2), and determines whether or not the error correction by the ECC is possible (S3).

When it is determined that the error correction by the ECC is not possible (S3: No), the MPU 25 returns the fact that the sector is a sector error (in this case, an uncorrectable error) to the host via the HDC 23 (S4). In addition, the MPU 25 returns to step S1 to read the data again, for example by slightly changing the read position on the magnetic disk 101, or by trying a more aggressive ECC. When the error correction is still deemed impossible to correct, the MPU 25 may return the fact that the sector is a sector error to the host.

When the error correction by the ECC is possible or an error for the ECC is not detected (S3: Yes), the MPU 25 executes CRC calculation (S5), and subsequently extracts generation information and the LBAs embedded in the CRC data of the read data (S6). When the CRC calculation result in step S5 is correct, the generation information and the LBAs are extracted. When the CRC calculation result is disturbed, the generation information and the LBAs are extracted as disturbed values. In this case, it may be detected by a combination other than the registration in the following step S23, and it may be as a "sector error".

Subsequently, the MPU 25 makes a first determination as to whether or not the extracted generation information matches the generation information stored in the memory 26 of the hard disk device 1 (S7).

When the generation information extracted from data on magnetic disk 101 matches the generation information of the hard disk device 1 for the sector (S7: Yes), the MPU performs an LBA check by checking LBAs embedded together with the generation information (S8), and determines the result of the LBA check (S9).

When the result of the LBA check is correct (S9: Yes), the MPU 25 determines that the sector is a sector in which writing has been completed in the current generation of the hard disk device 1, and performs a process on the sector as an OK sector (S10). For example, when there is a read command from the host, the MPU 25 returns the user data of the sector to the host, and when there is a write command, the MPU 25 writes the user data or the like in the sector, thereby updating the sector.

When the result of the LBA check is an error (S9: No), the MPU 25 returns a sector error to the host (S4).

In step S7, when the extracted generation information is not the generation information of the hard disk device 1 (S7: No), the MPU 25 determines whether or not the LBAs extracted together with the generation information match the current LBAs of the hard disk device 1 (i.e., the LBAs designated by the host) (S21).

When the extracted LBAs do not match the current LBAs of the hard disk device 1 (S21: No), the MPU 25 makes an inquiry to the generation correspondence table T based on the extracted pair information (the generation information and the LBA) (S22).

Then, based on the inquiry, the MPU 25 determines whether or not a combination of the extracted pair information is registered (S23). When the combination is not registered (S23: No), the MPU 25 returns a sector error to the host (S10).

When the combination is registered (S23: Yes), the MPU 25 obtains difference information related to the combination from the generation correspondence table T (S24).

Subsequently, the MPU 25 performs a second determination process for converting the LBAs designated by the host to old LBAs that may be written in the sector, as follows.

First, the MPU 25 calculates an LBA candidate by correcting the LBAs designated by the host to the old LBAs that may be written in the sector by the difference information obtained in step S24 (S25).

Then, the MPU 25 performs an LBA check using the LBA candidate (S26), and determines the result of the LBA check (S27). When the result of the LBA check is an error (i.e., the LBAs do not match) (S27: No), the MPU 25 returns a sector error to the host (S4).

When the result of the LBA check is correct (i.e., the LBAs match) (S27: Yes), the MPU 25 performs a process as an unused sector (S28). For example, when there is a read command from the host, the MPU 25 returns an initial value (all zero values) to the host even if the user data is written in the sector, and when there is a write command, the MPU 25 writes the user data or the like in the sector, thereby updating the sector. With this updating, the sector is updated with the new Modified CRC data including the current new generation and the LBAs in the hard disk device 1.

Meanwhile, there is a case in which the generation information of a sector is different from that of the hard disk device 1, but the LBAs match each other (S21: Yes). This occurs in a sector, which has LBAs that is the same as the original LBAs even after the reassignment of the LBAs and has never been written in the current generation of the hard disk device 1. The MPU 25 performs the detection and processing of such a sector, for example, in the following manner.

First, the MPU 25 compares the extracted generation information with the generation information of the hard disk device 1 so as to determine which one is newer (S29).

When it is determined that the extracted generation information is older than the generation information of the hard disk device 1 (S29: Yes), since the reassignment of the LBAs has not been performed with respect to the sector and the sector has never been recorded in the current generation, the MPU 25 performs a process as an unused sector (S28). For example, when there is a read command from the host, the MPU 25 returns an initial value (all zero values, or the like) to the host even if the user data is written in the sectors, and if there is a write command, the MPU 25 writes the user data or the like in the sectors, thereby updating the sector.

On the other hand, when the extracted generation information is newer than the generation information of the hard disk device 1 (S29: No), the MPU 25 returns a sector error to the host because the CRC calculation result is disturbed (S4).

Steps S22 and S23 are examples of processing all the data of the generation correspondence table at once. When making an inquiry for each generation information in the generation correspondence table, steps S22 and S23 are repeated until the determination of step S23 is YES. For example, the inquiry may be made in descending order in the generation correspondence table, from higher generation information to lower generation information. With respect to all the generation information, when the combination of the extracted generation information and the LBAs is not recorded, the generation information and the LBAs include disturbed or corrupted values, and the process moves to step S4, thereby returning a sector error to the host.

As described above, according to embodiments of the hard disk device and the method of controlling the same, even when the LBAs are reassigned, the reformatting of the magnetic disk is omitted, and rewriting of CRC data is performed when accessing specific the sectors on the magnetic disk during use of the hard disk device. Therefore, when the hard disk device is initialized, it is possible to shorten the time to complete the initialization by the time interval typically required for the reformatting process. Furthermore, according to conventional approaches in the art, it is necessary to reformat all the sectors on the magnetic disk every time the initialization process is performed. However, in a hard disk device according to this embodiment and a method of controlling the same, since just the sectors to be accessed in the current generation are reformatted, it is possible to dramatically shorten initialization time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk device that accepts logical block addresses (LBAs) from a host, the hard disk device comprising:
a disk having a plurality of physical sectors from which data is read and to which data is written; and
a processor configured to perform read and write operations on the disk in response to read and write commands from the host that designate LBAs, wherein
the processor, in response to a request for initialization, does not perform any write operations on the disk, and generates a new mapping of LBAs to the physical sectors for a current generation based on unusable sectors detected during a previous generation and tracks differences in correspondence between LBAs and the physical sectors between the current generation and the previous generation.

2. The device according to claim 1, wherein in response to a write command from the host, the processor reads a physical sector corresponding to an LBA designated in the write command, and performs a write operation on the physical sector or returns an error based on data read from the physical sector.

3. The device according to claim 2, wherein the processor performs the write operation on the physical sector if the data read from the physical sector indicates a generation number that matches a generation number of the current generation and an LBA that matches the LBA designated in the write command.

4. The device according to claim 2, wherein the processor performs the write operation on the physical sector if the data read from the physical sector indicates an LBA that matches the LBA designated in the write command and a generation number that is smaller than a generation number of the current generation.

5. The device according to claim 2, wherein the processor performs the write operation on the physical sector if the data read from the physical sector indicates an LBA that differs from the LBA designated in the write command by an expected difference that is determined from a generation number and an LBA indicated in the data read from the physical sector.

6. The device according to claim 2, wherein the processor performs the write operation on the physical sector and writes data written by the write operation includes a current generation number and the LBA designated by the host.

7. The device according to claim 1, wherein in response to a read command from the host, the processor reads a physical sector corresponding to an LBA designated in the read command, and returns zeros or an error in response to the read command, based on data read from the physical sector.

8. The device according to claim 7, wherein the processor returns zeros if the data read from the physical sector indicates a generation number that matches a generation number of the current generation and an LBA that matches the LBA designated in the read command.

9. The device according to claim 7, wherein the processor returns zeros if the data read from the physical sector indicates an LBA that matches the LBA designated in the read command and a generation number that is smaller than a generation number of the current generation.

10. The device according to claim 7, wherein the processor returns zeros if the data read from the physical sector indicates an LBA that differs from the LBA designated in the read command by an expected difference that is determined from a generation number and an LBA indicated in the data read from the physical sector.

11. The device according to claim 1, wherein in response to a read or write command from the host, the processor reads a physical sector corresponding to an LBA designated in the read or write command, and returns an error if
  a generation number indicated in the data read from the physical sector matches a current generation number but an LBA indicated in the data read from the physical sector does not match the LBA designated in the read or write command; or
  the generation number indicated in the data read from the physical sector is greater than a current generation number.

12. The device according to claim 1, wherein in response to a read or write command from the host, the processor reads a physical sector corresponding to an LBA designated in the read or write command, and returns an error if:
  a generation number indicated in the data read from the physical sector is less than the current generation number and an LBA indicated in the data read from the physical sector neither matches the LBA designated in the read or write command nor differs from the LBA designated in the write command by an expected difference that is determined from the generation number and the LBA indicated in the data read from the physical sector.

13. A method of performing operations on a disk of a hard disk device having a plurality of physical sectors, said method comprising:
  in response to a request for initialization received from a host, generating a new mapping of logical blocks addresses (LBAs) to the physical sectors for a current generation without performing any write operations on the disk, based on unusable sectors detected during a previous generation; and
  tracking differences in correspondence between LBAs and the physical sectors between the current generation and the previous generation.

14. The method according to claim 13, further comprising:
  in response to a write command from the host, reading a physical sector corresponding to an LBA designated in the write command; and
  performing a write operation on the physical sector or returning an error based on data read from the physical sector.

15. The method according to claim 14, wherein the write operation is performed on the physical sector if the data read from the physical sector indicates a generation number that matches a generation number of the current generation and an LBA that matches the LBA designated in the write command.

16. The method according to claim 14, wherein the write operation is performed on the physical sector if the data read from the physical sector indicates an LBA that matches the LBA designated in the write command and a generation number that is smaller than a generation number of the current generation.

17. The method according to claim 14, further comprising:
  determining an expected difference from a generation number and an LBA indicated in the data read from the physical sector,
  wherein the write operation is performed on the physical sector if the data read from the physical sector indicates an LBA that differs from the LBA designated in the write command by the determined expected difference.

18. The method according to claim 14, further comprising:
  performing the write operation on the physical sector,
  wherein write data written by the write operation includes a current generation number and the LBA designated by the host.

19. The method according to claim 13, further comprising:
  in response to a read command from the host, the processor reads a physical sector corresponding to an LBA designated in the read command; and
  returning zeros or an error in response to the read command, based on data read from the physical sector.

20. The method according to claim 13, further comprising:
  in response to a read or write command from the host, reading a physical sector corresponding to an LBA designated in the read or write command, and returning an error if:
  a generation number indicated in the data read from the physical sector matches a current generation number but an LBA indicated in the data read from the physical sector does not match the LBA designated in the read or write command; or
  the generation number indicated in the data read from the physical sector is greater than a current generation number; or
  the generation number indicated in the data read from the physical sector is less than the current generation number and the LBA indicated in the data read from the physical sector neither matches the LBA designated in the read or write command nor differs from the LBA designated in the write command by an expected difference that is determined from the generation number and the LBA indicated in the data read from the physical sector.

* * * * *